(12) United States Patent
Mendelson

(10) Patent No.: US 7,924,149 B2
(45) Date of Patent: Apr. 12, 2011

(54) SYSTEM AND METHOD FOR PROVIDING ALARMING NOTIFICATION AND REAL-TIME, CRITICAL EMERGENCY INFORMATION TO OCCUPANTS IN A BUILDING OR EMERGENCY DESIGNED AREA AND EVACUATION GUIDANCE SYSTEM TO AND IN THE EMERGENCY EXIT ROUTE

(76) Inventor: Ehud Mendelson, Coral Springs, FL (US)

( * ) Notice: Subject to any disclaimer, the term of this patent is extended or adjusted under 35 U.S.C. 154(b) by 0 days.

(21) Appl. No.: 12/069,899

(22) Filed: Feb. 13, 2008

(65) Prior Publication Data
US 2009/0138353 A1    May 28, 2009

Related U.S. Application Data

(62) Division of application No. 11/427,706, filed on Jun. 22, 2006, now abandoned, which is a division of application No. 11/429,864, filed on May 8, 2006.

(60) Provisional application No. 60/678,947, filed on May 9, 2005.

(51) Int. Cl.
*G08B 1/08* (2006.01)

(52) U.S. Cl. ............ 340/539.11; 340/539.13; 340/572.1
(58) Field of Classification Search ............ 340/539.11, 340/539.13, 539.18, 572.1, 573.1, 825.49, 340/10.1; 455/456.1, 456.4, 457; 705/14.39, 705/22; 707/10, 102
See application file for complete search history.

(56) References Cited

U.S. PATENT DOCUMENTS

| | | | |
|---|---|---|---|
| 7,031,875 B2 | 4/2006 | Ellenby et al. | |
| 7,034,678 B2 * | 4/2006 | Burkley et al. | 340/539.13 |
| 7,245,216 B2 * | 7/2007 | Burkley et al. | 340/539.13 |
| 7,483,917 B2 * | 1/2009 | Sullivan et al. | 707/104.1 |
| 2003/0050039 A1 * | 3/2003 | Baba et al. | 455/404 |
| 2006/0095331 A1 * | 5/2006 | O'Malley et al. | 705/22 |
| 2009/0006418 A1 * | 1/2009 | O'Malley | 707/10 |

* cited by examiner

*Primary Examiner* — Van T. Trieu

(57) ABSTRACT

The system method described herein could guide people around urban environments indoor and outdoor, provide accurate update and real time emergency notification and information to the building occupants or to the emergency designated area to his cellular phone, We have focused on the task of providing a real time emergency information and navigation along the emergency exit route, The information will be received directly and will display on the existing cellular phone as Bluetooth application.

21 Claims, 8 Drawing Sheets

Fig. 5

Program Elements

| | |
|---|---|
| 507 | Multi Use Non Emergency Navigation |
| 508 | Portable Rechargeable Networkable |
| 509 | Real-Time Information |
| 510 | Audio Video |
| 511 | Option for Dynamic Deployment |
| 512 | Cellular Phone Application |

| | |
|---|---|
| No cellular network needed | 601 |
| Deliver Proximity Messages | 602 |
| Pin-Point Delivery | 603 |
| Instant Emergency Procedure & Map | 604 |
| Navigation to exit | 605 |
| Locating & ID report | 606 |

SYSTEM AND METHOD FOR PROVIDING ALARMING NOTIFICATION AND REAL-TIME, CRITICAL EMERGENCY INFORMATION TO OCCUPANTS IN A BUILDING OR EMERGENCY DESIGNED AREA AND EVACUATION GUIDANCE SYSTEM TO AND IN THE EMERGENCY EXIT ROUTE

CROSS REFERENCE TO RELATED APPLICATION

This application is a divisional to the patent application Ser. No. 11/427,706 Filed Jun. 22, 2006 now abandoned that is a divisional of application Ser. No. 11/429,864 filed May 8, 2006 that claim the benefit of the provisional application U.S. 60/678,947 filed May 9, 2005.

FIELD OF THE INVENTION

A system and method to provide infrastructure for indoor and in buildings guide and emergency navigation providing critical emergency alarming notification information to occupants in a building or emergency designated area and evacuation guidance system to and in the emergency exit route directly to the user mobile phone, the method and system can be use for non emergency applications.

This invention is directed generally to the field of emergency and navigation and, more particularly, to such method to be used indoors or outdoors in cases of emergency to notify, assist, and provide critical emergency information in real-time to building occupants or to people in emergency designated area provide them notification emergency critical emergency information's and evacuation guidance to and in the exit routes.

BACKGROUND OF THE INVENTION

Knowing that there is an emergency what is the emergency procedure and where the emergency exits are in buildings you frequent can save your life. Many disasters could have been prevented if people had known that there was an emergency situation what to do—the emergency procedure and where the exit routes were.

Delivering real-time alarming notification and critical emergency information in time and to the people who need it—lessons from recent emergencies show the important need of a system and method to provide critical information in real-time to the people trapped in a building or in an emergency area. Posting evacuation procedure and maps is essential to communicate safety information to building or emergency area occupants.

It many countries, it is required that all new commercial buildings include well-marked emergency exits. In countries where emergency exits are not standard, fires will often result in a much greater loss of life.

One of the important features of our indoor navigation techniques will provide people inside a building with the ability to navigate inside the building and to find their way out. Our System also provides the building occupants with critical emergency information in real-time, from the alarming and notification to the emergency procedure to navigate to the safety exit and out of the emergency.

Our System provides a low-cost, reliable method by which to navigate for people trapped inside buildings or emergency designated area, where a GPS is not reliable, or even more likely unworkable, because no signal can be received at all inside buildings.

Our System envisioned this limitation of GPS based systems, and is intended for an environment that is potentially much less "friendly", the environment inside a building that may contain smoke, dust, or flames, and is intended to leverage advances in ubiquitous RF/Bluetooth tag technology.

Our System will exploit the capability of storing critical building information, such as the floor maps the building blue print and the emergency escape plans, for retrieval and navigational assistance via a Bluetooth enabled Our system envisioned this limitation of GPS based systems, and the cellular communication as well the text messages and the internet in emergency and is intended for an environment that is potentially much less "friendly", and less demanding as proof over and over in most emergency situation when the cellular network fail.

Our system will exploit the capability of storing critical building information, such as the floor maps and the emergency escape plans, for retrieval and navigational assistance via a Bluetooth enabled cellular phone, pin-points directly when and where it is needed.

Moreover, our System can serve as a navigator to an emergency exit route. A user can download a building's emergency exit floor plan and escape routes and determine his exact location in that route.

Our system tries to cover all the aspects of emergency scenario, from start to the end.

Aspects of the emergency scenarios to be included:
Alarming and notification, real time critical "push" of emergency information—the emergency procedure and help the "user" to find and navigate to safety.

- Provide an alarming sound that can trigger by remote to alert the building occupants for emergency the same alert can be display on a Lcd screen and also broadcast via FM radio to reach all the proximity occupants (even if they don't have cellular phone with them).
- Provide a notification to the users in the emergency proximity directly to the area designated as emergency and directly to the "users" mobile phone via Bluetooth and all of that without the need for cellular network.
- Option to identifies the exact location of a "user" (a tenet in a building or a guest in that location) for a report back to the first responders.
- Provide real-time critical emergency information to the people in the building, such information like exact situation information and event details and emergency procedure include area/building emergency map.
- Provides the user with navigation information and directions for safely exiting of the building.

From the outset, our system was been designed with the capability to utilize existing technology so it can be deployed as a stand-alone system, or in tandem with existing systems. We focused on technology already in place that simply needs to be expanded.

With the implementation of our system, a people in a building will be empowered to navigate and find its way in a case of emergency or a disaster. This capability can be a critical life saving power in modern congested urban living conditions, not available before now.

We believe that implementation of our system will assist counter terrorism activities and more importantly will help the first response teams to save the lives of people trapped inside buildings or in an emergency area especially when you need to pin point your emergency need. It can save life.

Because the system knows the Bluetooth beacon positions, and the distance between them it, it is easy to determine the "user's" exact location.

Map Matching

The navigation solution is further enhanced, although it is not essential, when the system knows that the person or object being located is traveling along known routes on a map; for example, the system can assume that people can only follow certain routes in a building. This is priori information that can be used to "force" the estimated position to be on the nearest point on the possible routes. The constraints of indoor construction similarly can be used to refine estimates of the position of a person or object moving within a building-people and objects do not pass through walls, they pass along corridors and through doorways. It is a best solution for a system in case of an emergency or for a system for homeland security or a system to locate and inform the person location on emergency situation, a good example is the hotel or a mall exit floor map.

More over by using the known position of the Bluetooth beacons and because the signal of the Bluetooth beacons can be set between 5-10 m getting a signal from the beacon can establish accuracy of 5-10 m level. our system develop to identify and navigate to the recommended exit route The system will provide building occupants help to exit a building safely and efficiently as well with the real-time critical information alarming notification emergency procedure and how to exit to safety.

It many countries, it is required that all new commercial buildings include well-marked emergency exits. In countries where emergency exits are not standard, fires will often result in a much greater loss of life.

Emergency Evacuation Maps

Posting evacuation maps is essential to communicate safety information to building occupants. A nationally recognized Standard for building evacuation signage has not been established, but the Occupational Safety and Health Administration (OSHA) offers regulations for creating efficient emergency evacuation maps. These regulations apply to Workplaces in general industries.

Learning from 9/11 Events

Individual factors: Participants evacuee from the event at 9/11 cited factors that affected their decision to begin evacuating:

1. Unexperience in evacuation of a WTC tower, including knowledge of stairwell locations and whether individual stairwells led to street level exits; 2) information regarding what had occurred, what floors were involved, The qualitative data also suggested that, after a decision to evacuate was made, many persons stopped to attend to last-minute activities. Deciding which route to take (e.g., stairs or elevators) might have delayed evacuation progress.

Organizational factors: Two major organizational factors affecting evacuation were identified by participants: 1) workplace preparedness planning and training, including evacuation drills (e.g., when drills were held, the majority reported they never actually entered their designated stairwells) and 2) inadequate risk communication.

Building environmental factors: major evacuation factors in the WTC building environment were identified as 1) structural damage that blocked egress routes (e.g., debris on stairs or partially collapsed interior walls); 2) heavy congestion on certain stairways, which in some cases caused evacuees to move back upstairs in hopes of switching to a less congested stairwell; and 3) lack of back-up communication systems (e.g., public address system, elevator telephone system, and telephone system). When these systems failed, communication was severely limited.

Participants' experience with evacuations and emergency training varied by occupation Service workers and temporary employees were less likely than others to have received fire safety training or been instructed in procedures during an emergency. Temporary workers were at a disadvantage because of their lack of familiarity with building evacuation procedures. Many permanent workers, even those with years of experience in the buildings, also reported they did not know how to evacuate via routes that deviated from their normal paths. Many reported confusion at the sky lobby levels, where transfer to express elevators occurred.

Key Facts:

Fifty-nine percent of Americans will not evacuate immediately if directed to do so by officials. The most prevalent reason for noncompliance (47 percent) is the Desire to account for the whereabouts and safety of family or other dependents.

Forty-eight percent of parents are unaware of emergency preparedness plans at their children's schools.

Only 21 percent of Americans are familiar with their community's emergency response plan.

Only a small % of the guest in a commercial building are familiar with the building's emergency and evacuation plan.

An estimated 96% of students carry cell phones.

Although much effort by cellular companies after September 11, trace for people calling 911 from cell phone result of accuracy of 300-1000 meters and fail the requirement set by the FCC.

During recent emergency include the 9/11 the cell phone network went down and many cell phones calls and messages could not go through because of the huge demand.

Since there are more than 2 billion phones in use all over the world, of which 90% of the new one include Bluetooth communication, it seems obvious to include mobile devices and Bluetooth in public warning systems.

Making Building Evacuations Safer

Analysis of World Trade Center data on evacuees has found that many people were unfamiliar with the building's safety features, including Evacuation routes and that structural barrier such as heavy congestion, debris and lack of backup communications also impeded evacuation.

The study's initial findings suggest that some of the key factors affecting evacuation centered on individuals, such as a lack of prior experience in evacuation of the WTC buildings, including lack of knowledge of stairwell exits; unfamiliarity in general with the Building layout and uncertainty as to whether or not certain stairwells would lead to street level exits; poor physical condition and inappropriate footwear that delayed Progression; and a feeling that senior administrators and/or direct supervisors would disapprove of individuals leaving their work area that led to delays in Initiating evacuation.

Other factors such as inadequate workplace preparedness and problems related to the building environment, such as debris on stairways, partially collapsed interior Walls and heavy congestion on stairways also impeded evacuation.

Initial insights based on the first phase of the evacuation study suggest that preparedness planning at all levels can facilitate the rapid and safe evacuation of High-rise buildings. The study recommends that high-rise occupants should be personally responsible for becoming familiar with their building and its safety Features; individuals should know whether they are able to descend multiple floors; and they should have appropriate footwear readily available.

Background Wake-Up Calls

The 9/11 terrorist attacks on the World Trade Center and the Pentagon, the Madrid bombings, the London bombings, the New York subway failure and the Virginia Tech event, were an early demonstration of the weaknesses and failures of the existing emergency response communications infrastructure and antiquated radio-frequency systems.

On that critical day, radio transmitters and cell sites including telecommunications infrastructure were damaged. Emergency personnel could not communicate in these challenging environmental conditions. There were tremendous gaps in command and control. Firefighters were cut off from critical communication because their radio systems failed. Many lives were lost.

"When the towers went down the cell sites were lost.

As cell sites dropped, so did the communications. We operated on Nextel, then Nextel dropped, then they came back up. And the thing with the walkie-talkies—I'm not an expert, but I can tell you this: Go to any of the communications companies out there, go to the best, go to Motorola, go to the best there is, show me one radio, show me one radio that they will guarantee you this radio will go through that metal, it will go through the debris, it will go through the dust, you will have 100 percent communications 100 percent of the time. There is none. There is none." **—Former NYC Police Commissioner Bernard Kerik One of the huge lessons of the tragic shooting deaths at Virginia Tech this past spring is the importance of a campus-wide alert system that reaches all students, faculty, staff and visitors.

Such a system would be capable of making them immediately aware of any emergencies or danger present on the campus.

Since the deaths of 32 people on the Virginia Tech campus, the school has moved toward an early alert system that relies heavily on cell phone messages and text messaging. Unfortunately, cellular communication is prone to crash in an emergency as it did in the Virginia event. The registration type text messaging system depends on cellular communication that does not usually continue in service, so messages may not be received.

Existing Systems

Web and Email messages

Web

Emergency notification presented over a web interface may provide information, but cannot be considered a warning device, Email E-mail is one of the few mobile services that have a direct capability with service in the fixed network. An increasing number of mobile devices are capable of supporting e-mail.

Email meeting requirements Email is able to reach a large number of citizens, including roaming visitors, in near real-time in their desired language. Location specific information is not possible.

Email is able to reach citizens in their homes and at their work place. It is less likely or unlikely that citizens have access at public venues, outside on foot, and in or on (moving) vehicles (with the exception of Blackberry device owners). Email is able to verify successful delivery, by having the mail acknowledged; this is not a real-time acknowledgement; an application on the mobile phone can convert a text message to speech; does not address congestion management on the internet. Messages may be recognizable as emergency messages; messages remain available until they are deleted; messages can be reviewed later; messages show the identity of the originator, but the identity may be spoofed; notification services do not affect battery power consumption.

TV and Radio

Analogue and digital radio and TV broadcast, including RDS and DAB, are not specifically targeted at mobile devices and do not use the GSM or UMTS infrastructure. However, radio and television already play in important role in emergency warning systems, since they fulfill a number of requirements for a public warning system: Radio and TV are able to reach a large number of citizens, including roaming visitors, in near real-time in their desired language. Location specific information is not possible. The notification is only intrusive when a radio or TV is switched on.

Cell Phone Messages

ETAS and SMS for Fixed Lines

An Emergency Telephone Alert System (ETAS) is a strong candidate in a public warning strategy, since it can alert citizens in their homes, particularly at night. SMS for fixed provides a similar service. Both technologies are by nature location specific. There is no mechanism to manage network congestion Short Message Service (SMS)

Short Message Service or SMS messages can be sent to a mobile terminal without special options needing to be set on the handset. SMS is widely known and accepted and messages can contain detailed instructions for citizens on required actions to take.

Under normal conditions, delivery can be almost instantaneous, but a large number of messages require considerable time (average cell can send 3600 short messages per hour). Since the mobile terminal acknowledges successful reception of an SMS, the retry mechanism guarantees a very high rate of successful delivery. Severe network congestion may lead to a delayed delivery. SMS in itself is not location specific. However, there are technical means to detect where mobile handsets are located. Active probing generates a lot of time consuming traffic on the signaling channels and passive probing requires expensive equipment, and considerable time.

SMS cannot provide warnings for roamers, since MSISDN numbers of visiting roamers are normally not available.

Siren

Sirens are used in many countries today in a public warning system, and already play a role in the public warning strategy.

Sirens Meeting Requirements

Sirens are able to reach a large number of citizens, including roaming visitors, in near real-time. Sirens are location specific and intrusive. Information in any language is not possible.

Sirens are able to reach citizens in their homes, at their work place, at public venues, outside on foot, and in or on (moving) vehicles, although they are possibly not heard when there is background noise; especially at public venues.

Sirens are not able to verify successful delivery, but retry is achieved by repeating the signal; do not support delivery to the hearing disabled; congestion management is not an issue. Messages are recognizable as emergency messages; Identity of the originator is not an issue.

Public Warning Tomorrow

Since there are more than 2 billion mobile phones in use all over the world, of which 90% of the new one include Bluetooth communication, it seems obvious to include mobile devices and Bluetooth in public warning systems.

An important conclusion on public warning is that there is no single technology that fulfils all requirements at all times under all circumstances. Authorities must therefore design and define a strategy for public warning, based on multiple systems and technologies. Enhancing the current public warning system by using the cellular phone with Bluetooth device seems obvious.

During the emergency and immediately after the emergency citizens should also be able to receive information, but network congestion is likely to occur in many types of networks. In the aftermath of the emergency the elements of real-time and location may be less crucial, but the telecommunications infrastructure may have become damaged.

The public warning strategy prior to an actual emergency (no emergency predicted or foreseen) is considered to be outside the scope of most emergency system available today since any emergency events include the elements of alarming, what actions to take in case of an emergency—the need for emergency procedure and real-time information to assist how to get out of the emergency to safety.

The real-time element is likely to be important, when no time can be lost to increase the chances of survival or to mitigate damages.

Citizens need to have relevant information that is specific to the location. In the area where the emergency actually happens, the information ("evacuate the area") might be quite different from the information that is relevant in the area a bit away from the emergency ("go indoors and close doors and windows").

Our Vision

In an emergency situation the authorities can pinpoint the emergency information and the notification to the exact emergency proximity, exactly to the right people there.

And To there cellular phones even if we don't know who they are, like if they are guest and not In any emergency list . . . and all that even if the cellular communication Will fail or even not exist at all . . . .

And what if the people trap inside the emergency area can pull the emergency Guidance to their cellular phone and navigate safely to the exit rout . . . and again doing that without cellular communication.

And even more . . . the same system will allow the first responder to get Location and identification of the people trap inside by locating there cellular phone From out side the building via our Bluetooth system in a more accuracy then any cellular locating technology available Today . . . .

Moreover our innovation will allow the user to use a "local instant emergency messaging system", when local building/company/mall/university/school can have the ability to communicate with other people via Bluetooth and chat and exchange important messaging for free without the need for cellular network at all . . . .

And what if the system is easy to implement and have multi use In a non emergency situation as a campus/mall/building navigation . . . .

Our Solution our unique approach, uses actual building layouts and existing emergency floor plans are Bluetooth based protocol. Our system has the ability to receive and push real-time emergency critical information to the area "user's" cellular Bluetooth enabled devices.

With the remote alarming and broadcasting via audio and video it is the best solution in an emergency situation like the recent event at Virginia Tech.

Our System has 3 Parts:

1. Real-Time Emergency Alarming and Notification

Push alarming and emergency information to cellular phone in the emergency area via Bluetooth, broadcast instantly the information via FM and video screens.

2. Emergency Procedure and Mapping

Pull/download via Bluetooth the emergency procedures including the buildings mapping.

3. Emergency Guidance and Navigation to and in the Exit Route

Provide information to Navigate to the exit route

Also the system has a unique option to report to first responders by allowing identification of trapped people in the emergency and locate them, and even communicate with them from outside and again without need of the cellular communication.

The Mobile devices will able to determine their location WITHOUT ANY USE OF CELLULAR OR INTERNET COMMUNICATION . . . .

JUST the cellular phone with Bluetooth device . . . !!!

More over our innovation will allow the user to use a "local instant emergency messaging system", when local building/company/mall/university/school can have the ability to communicate with other people via Bluetooth and chat and exchange important messaging for free without the need for cellular network at all . . . .

Recent emergency situation teach us that the cellular communication in emergency situation prone to crash do to the high volume of calls.

By using our method there is no need for the cellular communication at all, just to the telephone device with the Bluetooth.

More over by providing real-time critical information to the right people trap in the building via local Bluetooth you reach the right people that need the information in the right time.

Some of the options with our system is record and send when emergency occurs the last location of the people inside the building that done by collecting the last Bluetooth communication between the Bluetooth beacon and the "user" cell phone Bluetooth.

There is also option for broadcasting video messages from a central command to screens attached to the system the Bluetooth server to inform the people about emergency.

Also our system is integrated with our building/mall/store area navigation to provide navigation information at all time not only in emergency, will save cost.

Using our system will limit the rumors—the normal effect to any emergency by providing the right information to the right people.

Our system can be implementing with an alarm that can be remotely trigger to set the attention of the building occupant to the emergency situation. And to follow with the emergency procedure.

Our system is based on the Bluetooth technology offers two unique advantages: one is the ability to locate ubiquitous "anytags" (any Bluetooth enabled device that is not a tag, e.g most of the newer mobile phones). The other advantage is the multiservice nature of the Bluetooth infrastructure that enables using the location access points for other purposes, such as for navigating, remote monitoring and control, and for a variety of IP and messaging services.

All while maintaining complete anonymity. The system is trivial to implement on a large scale using existing technologies.

We present a system that provides an infrastructure for location aware that emphasizes the following key features:

Cost The system is not prohibitively expensive, and its costs should scale well with its size. We propose implementing the Bluetooth Beacons inside the emergency exit lights to serve even when the electricity is out.

Deployment Our system relies on technology that is already widely available and in use today.

The evacuation Guidance system can be part of our indoor navigation that include NAVMall, NavStore, NavShow, Nav-Conference for a Multipurpose use.

Our key element in our emergency system, can serve in emergency and non emergency situation, a Bluetooth based "gadget" we call "the notifier" a micro Detector contained in a small box that can be attached to the wall in any room, some of the key features are:

Scanning and Identifying people in proximity for emergency use. Can be set for use in non-emergency like "a black box in a room" or only in emergency situation.

Bluetooth based Deliver "push" real time emergency notification to the proximity people's mobile phone—without cellular network . . . .

allow the user to use a "local instant emergency messaging system", when local building/company/mall/university/school can have the ability to communicate with other people via Bluetooth and chat and exchange important messaging for free without the need for cellular network at all . . . .

Option for Built in LCD and FM broadcasting.

"WAP", "pull" service for downloading emergency map and procedure to the people's mobile phone.

Part of Navigation to the exit route.

Serve as a beacon for non emergency navigation, like campus, building, mall navigation.

Provide critical information regarding all elements of the emergency.

Easy deployment in dynamic emergency network.

Portable, rechargeable and networkable.

Can be implemented as an add-on to the existing security system.

The Need for Local Mapping and Local Navigation

Our innovation identify a great need and a gap in the technology available for local businesses LBS represent's a huge advertising market—estimated at over $150 billion a year.

Local mapping available today: Mall maps, store maps, mapping of the department store, commercial buildings maps—hospitals, schools, campus, municipalities, shopping center, down town district, Indoor facility, building maps, parking area, parking garage, amusements parks, subway trains, transit maps, museum maps, area attractions maps, hotel and resort maps, and even the emergency maps posted in any building.

All of the Above have the Following in Common:

local maps indoor and outdoor

Local maps available either on paper or on the web and in some cases on a kiosk in the facility.

Do to the accuracy needed and the location (can be indoors) the GPS can't provide a solution—GPS accuracy 200-300' when a signal is available. That is the reason that the GPS industry doesn't provide this type of mapping.

The same is true for cellular network providers, as the accuracy is also 200-300, when the signal is available (problem indoor) and problem when you need it most—in an emergency situation when most of the cellular network fails do to high demand. Again that is the reason that there is no local mapping available for cellular users. (Local mapping means=accuracy to a store, room, parking level . . . )

Most technology available today attempts to "locate" a moving "user" in an area, we reverse that idea and let the "user" navigate in the area—the local area on the local maps . . . .

Our solutions and methods are based on the same concept as GPS navigation but without the Satellite signals . . . or cellular network or towers . . . (The satellites in the GPS and the towers in the cellular network are the base for the triangulation calculation to determine the "user" location for the existing navigation methods).

Think of it as a navigation when and where the signal is used to determine the exact location (with much greater accuracy than the GPS or the available cellular technology) which is achieved by receiving a signal (a Bluetooth signal) from beacon devices which have a known location, and are installed in the local area.

By calculating the signals (triangulation method is one of them) coming from a known identifying beacon location we can achieve greater accuracy—less then 10 m.

This will allow NAVIGATION on LOCAL MAPS displayed on the "user" mobile phone via Bluetooth and without need of GPS and or Cellular networks . . . !

The System Includes:

Ability to load the local mapping (digitizer) at the facility via Bluetooth from a proximity WAP, and the ability to load the maps via the web prior to arrival to the area.

Ability to have special navigation software/either as an add-on to the existing navigation on the user cell phone or in his existing navigation system (car, mobile), as Bluetooth applications.

Ability to deploy of the Bluetooth beacons/WAP in the local area where the beacon will be a known location—waypoints to provide the infrastructure needed to navigate in the area. Ability of the beacons/waypoints to log/ID and store the "user" Bluetooth ID (NOT THE CELLULAR NUMBER) for future marketing purposes or for emergency use. This aggregation of data will be invaluable to retailers, etc.

Beacons can be old Bluetooth equipped cellular phones. Bluetooth enabled cell phones can be used as beacons (potentially for good use for millions of old cellular phones).

Example of Use

A user in a mall can load the mall maps at the entrance of the mall from a Bluetooth WAP system (can be inside the mall directory point), directly to his cellular phone via Bluetooth.

A Bluetooth navigation application on the user mobile phone will receive a signal from a known location Bluetooth beacon and will determine the "user" location on the local mall map (the same way as a GPS) with accuracy of 5-10 m.

(More beacons with LESS signal range=more accuracy)

We Based Our Assumptions on the Following Facts:

Mobile phones are the most carried device by any "user" globally GPS and the existing mapping can't handle the local mapping need especially indoor.

There is a great need for more accuracy outdoor and indoor GPS and cellular networks can't provide the accuracy needed, or the availability indoor/out door emergency situations.

The Bluetooth is the most used communication method today! and it is on more then 85% of the new cellular phone.

Bluetooth has a way to recognize other Bluetooth devices in the close proximity.

Most of the technology is already existing

We based our patent on direct communication between the Bluetooth beacons to the "user" cellular phone without the need of the Cellular network or GPS.

The local advertising marketing is huge with over $150 billion in revenue in the US alone.

We Identify 14 applications

| Nav4Parking | Return2Parking | Nav4Realty |
| Nav4Mall | Nav4Store | Nav4Sale |
| Nav4Museum | Nav4Conference | Nav4Show |
| Nav4Train | Nav4Disney | Nav4Sign |

Nav4 Events and Nav4Emergency that describe in more details in this papers.

We present a low cost and easily deployed infrastructure for local based navigation outdoor and indoor without the need for GPS and or cellular networks. More over it is specially fit for local area (indoor and outdoor) services when and where the GPS and the cellular network can't provide the solution and the accuracy needed to provide such navigation (10M or less).

Our system is based on existing Bluetooth, a technology that proves to be stable, simple, inexpensive and mature in the market use. More over it is the most used communication and is available on more then 85% of the new mobile phones.

Approach:

Our infrastructure consists of Bluetooth beacons installed in a known location in the local area. The beacons will respond to Bluetooth device inquiries that will be made by the "user" Bluetooth enabled cellular phone or other Bluetooth device.

The know location of the beacon is set in a small database; the lookup table list of the beacons (waypoints=the beacons Identities according to the Bluetooth address of the beacon) is attached to the local area mapping of the area.

The local area map (mall map, store, building map, area map etc. . . . ) will be available to download via a WAP system at the entrance of the building/mall/area or the directory places to provide the mapping for the navigation, The "user" can also download the mapping from our "map4nav.com" before approaching the place to be navigated.

The "user" Bluetooth cellular phone will scan the local area for the location beacons, when the "user" will be within 10 meters, the location beacons respond, thereby providing room-level navigation accuracy. With multiple beacons installed and possibly receiving more then one beacon's signal a simple triangulation calculation and options for signal strength will determine the exact location of the "user" on the downloaded map of the local area.

Other signals not on the database list will be ignored

There is a mixed use of Beacons and WAP depending on the application (for example in a mall application, the stores can have a WAP to deliver more content to the "user" mobile device where the beacons serve as navigation "antennae" and waypoints to help the "user" navigate the area.

In our system: beacons broadcast signal ID to ID the location on the map.

Wap will push content to the "user" mobile, from mapping to coupons or advertising, and may contain Bluetooth Hubs to be able to reach many "users" at a time.

Privacy:

The system doesn't collect personal information such as your name or phone number. It does, however, record the phone's identification number to build a profile of the user or the use of the phone in the area. It is like surfing the web where and when the "user" IP address is recorded for future marketing statistics and surfing habits Bluetooth marketing: especially at large shopping centers and public events, By targeting directly to the consumer, standing right outside your business or event, or walking toward your kiosk or restaurant, merchants can maximize their marketing budget while incorporating a new, inexpensive and effective form of advertising.

The technology does build profiles of which advertising phones should accept, and which they should reject. That tells advertisers which promotions are effective.

The "user" is in complete control. He can disable his Bluetooth or just reject content, there is no "spam" effect and the "user" is attracted by incentives rather than generic promotions.

The transfer time of content is only a few seconds and after the first delivery the "user" will not receive the same content again.

In a mall like environment the "user" incentive to use our innovation can be enhanced with the use of our key advantages and packages:

Parking—find parking and return to parkingNavigation in the store/mall to the right place/store/products to receive a special price/coupons etc. Allow the "user" for "smart" shopping experience, bring the "web" advantage to co-exist with real shopping life.

Nav4emergency—provides emergency notification and real-time instruction to exit to safety in emergency situation.

The method describe above is a direct communication between the "user" Bluetooth mobile device and the area beacons without the need of GPS, cellular communication or the internet.

More over our innovation will allow the user to use a "local instant emergency messaging system", when local building/company/mall/university/school can have the ability to communicate with other people via Bluetooth and chat and exchange important messaging for free without the need for cellular network at all . . . .

One of the biggest advantage of our system is that it introduces the concept of "ad sense"—"sense" of the shopper=option to automatically deliver content (text, image ad) that is precisely assigned according to the "user" location or his "social" shopping habits, the same concept that makes Google and other search engines so successful, and at the same time keep the "user" anonymous by collecting the "user" Bluetooth ID (like surfing the net and access web site, the web collects the IP address and according to it delivers precise advertising).

For the first time the local store, mall etc. will have the same tools that prove to be so effective.

Evacuation Guidance System

The events of 9/11 have taught us that the importance of successfully executing a building evacuation plan. Recently, the Occupational Safety and Health Administration was revised its Exit Route standard to emphasis the importance and necessity that all employees have a safe exit route out of a building in the event of an emergency evacuation.

With this in mind, we developed a prototype system "NavEmergency—Exit navigation—an emergency notification and evacuation guidance system", to identify and navigate to the recommended exit route The system will provide building occupants help to exit a building safely and efficiently.

Our system will exploit the capability of storing critical building information, such as floor maps and the emergency escape plans, for retrieval and navigational assistance, via a Bluetooth enabled cellular phone, when and where it is needed. Moreover our system can serve as a navigator to an emergency exit route when and where needed. Each user can load the emergency exit floor plan and escape with the knowledge of his exact location in that exit route.

Our system is based on a same concept provide in details in our patent pending U.S. application Ser. No. 11/427,706

We believe that our system can be implemented in any building and be part of the building emergency and safety plan as well to provide navigation in the area/building/mall/store at any time not limit to emergency.

Also, we believe that implementation of our system could assist counter terrorism activities and more importantly help to save the lives of people trapped inside buildings when emergency situation occur.

Dynamic Deployment Method

Allow allocation of notification and real-time alarming resources at the time they are needed—deployment of on-feet or movable carry-on "notifier" devices by first responders or emergency personal in an area designated as emergency but lack the emergency infrastructure for notification and alarming.

This approach can prove especially effective when emergency occur in an area Out of the regular plan that need to be covered.

The system will use the Bluetooth built-in protocol stack module that is able to simultaneously interconnect for local devices=portable phones in a "piconet" over the local area. The simultaneous connectivity limit of 8 devices at a time is overturn by the ability of several piconets to operate in a close proximity and Bluetooth devices=portable phones can rapidly move from one piconet to another, in fact Bluetooth devices need only remain a member of a piconet for the period of time required to complete a communication transaction. So devices=portable phones can join and leave a local piconet frequently, effectively overcoming the 8 device limit. And that even without the option to use a long range Bluetooth antenna that can effectively reach a distance of over 1000 m.

The ability to form wireless as hoc Bluetooth network or networks based on a collection of Bluetooth "notifiers" (mobile notifiers devices) that dynamically form a temporary network as long as these device are within a sufficient range (inside a room or a building), the flexibility in ad hoc network is what makes it suitable choice for emergency deployment scenarios where multiple "notifier" devices would be deploy in a proximity area that designate as emergency to provide a new way of distributing emergency and alert information directly to the needed area.

More over, as a normal human behave there is no need to inform a full room, if only a few people from the occupied room will be informed or have the portable phone to receive the emergency information it will be more then needed as the information will be shared by the informed people.

The same method and idea is mimicked by the dynamic deployments, just think about it as a new way to deliver critical emergency alarming and notification without infrastructure In the area.

More over, the limitation of Bluetooth cover can be well overwhelmed by the ability of the Bluetooth method described above, for instance, in a very large conference hall, the localized Bluetooth network (piconet) can join each other and form a big network that covers the entire hall much larger then the limit cover of the Bluetooth. Portable phones at one end of the hall communicate with a device at the other end and the traffic might be relayed via several bridge devices. Any Bluetooth devices, in our example portable phones that are Bluetooth enabled, can become the bridge. The phone owner does not need to know whether his/her device is a bridge, it is all done automatically as part of the Bluetooth protocol stack routine, in effect not changing any internal behavior of the Bluetooth.

More over our innovation will allow the user to use a "local instant emergency messaging system", when local building/company/mall/university/school can have the ability to communicate with other people via Bluetooth and chat and exchange important messaging for free without the need for cellular network at all . . . .

And again, there is no need to reach all the people, only a few in a room to inform the emergency message.

From the old days in history, humans used messengers to deliver news and information Our method uses the old concept with a device that will make it easy to distribute and broadcast the information around, using the messengers as the mobile emergency notification or as we call it—Dynamic deployment.

it's can save lives . . . .

prior art, At present, however, no prior art device utilizes the capabilities to display a real-time representation of navigating directly from the sensors without a central system; and without using a GPS based system directly to the "user". Also most of systems are designed for the old query type search where interface to internet and or database central system needed.

Our system automatically detects a signal directly from the sensors Bluetooth beacons, no communication needed not even cellular communication. Other systems must have bandwidth available, over which to send a request to a central system, or to a database, and then must wait for a response. This takes time!

Even if the other systems have bandwidth, they still based on the existing search concept where under the user submits a query, searches and awaits for the response. All impractical Our system provides the information automatically, without submitting any query, and the response is according to the user's location.

Again, most of the existing prior arts are based either on a GPS based system that depends on a GPS too. And the existing mapping that these systems use has the same limitations described previously and is impractical.

We believe that our system method bridges the gap between the GPS based navigation and provides a complete solution.

U.S. Pat. No. 7,031,875 Ellenby et al. describe a pointing system for addressing objects, provide a system and method based on GPS and internet/database communication, it is not exactly a navigation but a information based system that need the GPS to locate the user location so indoor services is likely out of the questions and the need for communication as well with GPS limit its availability and accuracy.

Indoor Location Technologies.

Various technologies are used for wireless indoor location. These may be classified in two aspects:

The algorithm—i.e. the method of location used.

The physical layer—i.e. the wireless technology used to communicate with the mobile device.

Location Methods

Typically, the methods used in indoor locations are "borrowed" from the outdoor GPS location methods inventory. Specifically, four types of method are used indoors:

Proximity Detection (PD), Received Signal Strength (RSSI), Time of Arrival (TOA), and Angle of Arrival (AOA).

Proximity Detection (PD)

This method relies upon a dense grid of antennae, each having a well-known position. When a mobile is detected by a single antenna, it is considered to be collocated with it. When more than one antenna detects the mobile, it is considered to be collocated with the one that receives the strongest signal.

This method is relatively simple to implement. It can be implemented over different types of physical media. In particular, IR and RFID are based on this method.

Triangulation

Triangulation takes PD a step further, in the sense that it is based on measuring the signal level measurements from each antenna (possibly by using a triangulation mechanism), with respect to each mobile device. Following that, mobile is located by using a triangulation algorithm.

Like the PD method, triangulation is relatively simple to implement.

Time of Arrival (TOA)

TOA is based on triggering the mobile devices to respond, and measuring the time it takes for the response to flyback to the antenna. The elapsed time represents the distance between the two. By using distances from few antennas, a mobile's position can be triangulated. TOA is considered to be the most accurate method, because multi-path effects can be filtered out. Yet, it is considerably more complex to implement, as it requires a modification to the hardware on the mobile side, as well as special modifications on the antenna side.

Angle of Arrival (AOA)

AOA is based on finding the direction of maximal signal intensity for each antenna-device pair. By finding the intersection of several such direction vectors, a mobile's position can be estimated AOA is considerably less accurate than TOA, due to limited angular resolution and the fact that indoors much of the signal is reflected. Also, AOA antennae are more complex, as they require multi-section, highly directional antennas, and multiple RF circuitry.

WLAN (IEEE 802.11b)

This midrange wireless local networking standard, operating in the 2.4 GHz ISM band, has become very popular in public hotspots and enterprise locations during the last few years. With a typical gross bitrate of 11 Mbps and a range of 50-100 m, IEEE 802.11b is currently the dominant local wireless networking standard.

It is therefore appealing to use an existing WLAN infrastructure for indoor locations as well, by adding a location server. Such solutions do exist in the market, providing an accuracy of ~2 m.

One limitation of such systems is the fact that WLAN tags are relatively bulky and power hungry. Thus, such locators are mainly useful to locate WLAN enabled instruments, such as portable computers.

Note that in WLAN, antennae are actually part of access points (APs), through which devices communicate with the access network. This is also the case with Bluetooth.

Bluetooth (IEEE 802.15)

Bluetooth is a newer wireless local networking standard, that operates in the 2.4 GHz ISM band. Compared to WLAN, the gross bitrate is lower (1 Mbps), and the range is shorter (typically 10-15 m, although there are tags with a range of over 300 feet). On the other hand, Bluetooth is a "lighter" standard, highly ubiquitous (embedded in most phones, PDAs, PC peripherals, etc.) and supports, in addition to IP, several other networking services. Notably, Bluetooth supports serial port emulation, voice, and various types of object exchange.

Bluetooth tags are small, pocketsize transceivers.

Every Bluetooth device's tag has a unique ID. This ID can be used for locating the tag.

Bluetooth Indoor Location

How does Bluetooth Location Work?

Bluetooth was not made originally for location. From the outset, the standard was designed for communication, in a personal area networking (PAN) environment. However, to facilitate this task, particularly in dynamic ad-hoc scenarios, devices need a mechanism to identify their neighbors, to synchronize, and finally to connect. Such mechanisms have indeed been built into Bluetooth. More importantly, these mechanisms can also be used to obtain an accurate location.

There are two approaches to Bluetooth location:

Binary location—a room-oriented approach, uses the PD method. An access point is installed in every way point. For each tag, the system than finds the nearest AP, and respectively indicates its way point location.

Analog location—an X-Y oriented approach, based on the RSSI method. APs are installed more sparsely (typically, 10-15 m apart). For each tag, the distance from each way point is measured, and the system triangulates the tag's position.

An AP finds a tag by using one of two Bluetooth mechanisms, Inquiry and Paging, that are used normally for link setup:

The Inquiry mechanism—provides a way for a Bluetooth device to discover its neighbor's Bluetooth ID. An inquiry process typically takes 5s. It concludes with the inquirer (typically the AP) having the IDs of all those Bluetooth devices (tags) within its RF range. The relevant location scenario is that of browsing all tags nearby.

The Paging mechanism—following an inquiry, the inquirer can page (set up a link with) one or more of its discovered neighbors. A paging process typically takes 1-2 s. This mechanism is faster, but requires a previous knowledge of the tag's ID (as well as the Bluetooth clock phase). The relevant location scenario is that of searching for a certain tag. It is the most accurate and the faster response time and it is our method in door navigation when and where each tag is known address position—waypoint.

Why Use Bluetooth for Indoor Location?

Bluetooth has some advantages in the context of indoor location. These include:

Bluetooth uses RF—in the 2.4 GHz ISM band, specifically. In this frequency range, radio waves penetrate obstacles, such as walls and human bodies, albeit with a substantial loss.

This has two implications:

Availability is high—there is always some signal received by the access point. AP density can be low—the access points can be placed relatively far apart (typical range is 10-15 meters, i.e. not necessarily of one in each way point).

Bluetooth is ubiquitous—Bluetooth chipsets are being implanted everywhere nowadays (phones, accessories, computing devices, etc). The fact that a Bluetooth location system can locate any Bluetooth enabled device, makes it more cost-effective. This means that an increasing fraction of humans and mobile assets around would become locatable in a Bluetooth covered site, with no additional hardware cost (no tags attached). The only need is to pre-register these devices.

Bluetooth is a low power technology—tags need recharge, approx. once a week (or longer, depends on the usage scenario). Nontags (e.g. BT enabled phones), are being recharged anyway on a regular basis, so they do not need special recharges. If they are being used for location, the fraction added to their usual (no Bluetooth) power consumption is relatively small.

Bluetooth is a low cost technology—the high expected production volumes (hundreds of millions annually) lead to sub-5$ per chip. This goal has already been met by few IC manufacturers. This would eventually result in a low price for the Bluetooth tags, if and when Bluetooth location systems would become sufficiently ubiquitous.

Bluetooth is a multi-functional communication standard—location is only one of the services that can be supported by a Bluetooth infrastructure. The same infrastructure can be used to provide additional network services, particularly remote monitoring and control (by using a serial interface). In addition, Bluetooth provides voice and IP services (although for the later, WLAN is typically more suitable).

In open spaces, relatively free of obstructions and walls (e.g. a large warehouse or a public hotspot), Bluetooth alone would suffice to provide a ~2 meter error range.

Conclusion

The Bluetooth technology offers two unique advantages: one is the ability to locate ubiquitous "anytags" (any Bluetooth enabled device that is not a tag, e.g. most of the newer mobile phones). The other advantage is the multiservice nature of the Bluetooth infrastructure that enables using the location access points for other purposes, such as for navigating, remote monitoring and control, and for a variety of IP and messaging services.

Non Emergency Applications:

The system use and costs should scale well with its ability for multi use in a non emergency to provide local navigation on campuses, buildings, hospitals, hotels, malls etc. . . . without GPS or cell network using the Bluetooth beacon for navigation. Some of the key applications are:

NAV4Mall™ NAV4Store™ NAV4Sale™ or just University or Building Navigator

Explore the indoor mall or inside a department store, navigate to the right place or the store or the department that you need. Navigate on the mall map/store mapping to find your way around all using your cellular phone or navigation system without a GPS. A new kind of service and new marketing way for the malls/store business owners an add-on to local advertising.

The local advertising market estimates to be $134 Billion in US alone . . . , the mapping is the "forefront" of a local strategy, do to the lack of availability of the GPS indoor as well with the limitation of it's accuracy outdoor and the un-updated of the mapping that provide today by the mapping and GPS industry there is no real tapping to this huge market.

We believe that our innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. The store will have also an option to deliver more content (advertising, sale, coupons, promo etc.) to the user when he approach the store or already is inside via Bluetooth push to the user cellular Bluetooth enable. And in emergency—the nav4emergency will kick in.

NAV4Museum™ NAV4Conference™ NAV4Show™

Explore museum or conference show exhibits in a new unique and easy way, find your way around when navigating on the floor map of the museum conference or the show, indoor navigation, navigate to exhibits restaurants, cafes, lavatories etc. . . . all to the "user" navigation or cellular phone.

Any Museum Conference or show provided to the attended a mapping to the exhibits, some provide also additional audio device (headset) to get more information on the exhibits. Our innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc. . . . All to the "user" navigation or cellular phone and based on the facility map. And in emergency—the nav4emergency will kick in.

NAV4Train™

For all the users of mass transportation system our innovation will allow locate and point the "user" to the exact station or location on a route, an easy way to navigate in the train, subway, underground kind of system, a new way of "subway" or bus mapping in/out door and directly to the user's navigation or his cellular phone.

Every day millions of people are using the mass transportation system, trains, subways, buses, each of the passengers depend on the transportation map for the route information as well as schedules and additional services provided by the transportation system. Most of the passengers of today carry with them a cellular phone.

Our unique innovation will provide the passenger with the navigation inside the transportation system directly to the passenger's Bluetooth enable phone, the passenger will know exact location/station on the route as well with additional option information like schedules. A new add-on service to the transportation providers as well to the passengers, utilize our indoor navigation method, And in emergency—the nav4emergency will kick in.

NAV4Disney™

Theme and amusements Park navigation, navigate to your desire attractions as well with a new way for register to a "fast pass" kind off lane all in a easy way to the "user" cellular phone without need for GPS Provides a new media and-on service.

Ever wonder what it will be like to navigate inside the amusements park to the desired attraction, to know the schedules of the shows at the attractions and even to get your "fast pass" from a remote instead of standing in line. With our unique innovation all can be become reality and directly to your cellular phone without the need for a GPS.

We believe that our innovation can provide a new tool and service to the benefit of the amusements parks as well to the user. And in emergency—the nav4emergency will kick in.

Cellular next "Killer Application": Emerging technology markets are always on the lookout for that elusive "killer app"—the precious, irrefutable application that makes adopters stand up, take notice, and open their wallets. Once it's found, and as soon as adopters realize firsthand the value to be achieved, that killer application eventually expands into other, more advanced areas of adoption and innovation. According to research, the next in cellular telephony will be service depend on location base programming, when the cell phone user will receive information according to his location.

There are more than 150 million cell-phone users in the United States as of July 2004. Each day, thousands more sign up. A variety of mobile devices have been developed in recent years that are capable of supporting dynamic navigation and location-based services applications. These include wireless telephones, personal digital assistants (PDAs), personal navigation devices (PNDs) and laptop computers. We believe that our innovation will meet the desire of wireless service providers to increase their average revenue per user.

Posting evacuation procedures and maps is essential to communicate safety information to building or emergency area occupants.

Analysis of recent emergency situations on evacuees has found that many people were unfamiliar with the building's safety features.

Studies suggest that preparedness planning at all levels can facilitate the rapid and safe evacuation of High-rise buildings. The studies recommend that high-rise occupants should be personally responsible for becoming familiar with their building and its safety features.

One important part of counter-terrorism is emergency planning; commercial places like universities, schools, hospitals, Gov. buildings, malls, and stores have a tenants, employees or students—people that frequent the places; our suggestion is to make the cellular phone a very important part of life, even in emergency when most likely the cellular network will fail.

Fact: there is a need to train for emergency, knowledge of what to do in an emergency can save lives.

We suggest to have the emergency procedure reside in the cellular phone SD/ext. memory as part of emergency application that can be and must be part of the telephone applications, people that frequent a place like tenants, employees, and students can have the emergency procedure and the mapping ready on their phones, it can trigger from remote areas an emergency (to alarm the user etc. . . . ), it allows saving a critical time in the emergency for getting the information . . . .

It will also allow sharing information using the dynamic deployment method to other portable phones that in the proximity, and as is human nature, people will share information and notify the other people, In other word what we suggest is to have the emergency procedure prepared and resided in the portable phone as part of emergency procedure and making the portable phone a center for emergency notification and help the "user" to find his way to safety in emergency situations. We suggest making the emergency application an integrated part of the cellular phone application; we may offer a template to have the emergency procedure and the mapping setup according to the location and places.

It can be a mandatory for students in schools and employees in the workplace to store this critical information ready for the emergency.

The other option of "pulling" is to download the critical information when in an emergency via Bluetooth, but to save the critical time it suggests that you will have to prepare in advance for an emergency.

In a mall/store environment just think about the ability to store the mall/store map or directory on the telephone ext. memory (just like a GPS mapping), the stores in a mall will be like point of interest, and the infrastructure of our Bluetooth beacons inside the mall/store will allow navigation inside the store/mall.

The information (mapping and directory) can be pre downloaded from the internet before access to the area or downloaded from a "wap" system at the directory information in the entrance of a mall.

Such a service can be easily backed by advertising from the stores and may be offered freely to the "users".

"The question now is not 'whether to adapt?' but 'when to adapt?'.

SUMMARY OF THE INVENTION

In accordance with the present invention, these are our project's characteristics:
Our system is a navigation method based on the following unique characteristics:

Our unique approach, uses actual building or emergency area layouts and existing emergency floor plans. Our system has the ability to receive and push real-time emergency critical information to the area "user's" cellular Bluetooth enabled devices.

With the remote alarming and broadcasting via audio and video it is the best solution in an emergency situation like the recent event at Virginia Tech.

Our system has 3 parts:
1. Real-Time Emergency Alarming and Notification
   Push alarming and emergency information to cellular phone in the emergency area via Bluetooth, broadcast instantly the information via FM and video screens.
2. Emergency Procedure and Mapping Pull/Download Via Bluetooth
   the emergency procedures including the buildings mapping.
3. Emergency Guidance and Navigation to and in the Exit Route
   Provide information to Navigate to the exit route
   Also the system has a unique option to report to first responders by allowing identification of trapped people in the emergency and locate them, and even communicate with them from outside and again without need for cellular communication. More over our innovation will allow the user to use a "local instant emergency messaging system", when local building/company/mall/university/school can have the ability to communicate with other people via Bluetooth and chat and exchange important messaging for free without the need for cellular network at all . . . .

The Need

Knowing emergency information and then where the emergency exits are in buildings you frequent can save your life. Many disasters could have been prevented if people had known that there was an emergency situation the emergency procedure and where the exit.

Delivering Real-Time Alarming and Critical Emergency Information in Time and to the People Who Need it.

Lessons from recent emergencies show the important need of a system to provide critical information in real-time to the people trapped in a building.

Recent events have revealed the failure of the cellular communication and the email/text messaging as an emergency notification. There is a need for instant delivery of critical information to the "right" people trapped in the building, directly to their cellular phone.

Emergency Evacuation Plan

Posting evacuation procedure and maps is essential to communicate safety information to building occupants.

Providing Commercial Building Critical Emergency Information and Safer Evacuations: The Lessons of Virginia Tech and 9/11 Analysis of World Trade Center data on evacuees revealed that many people were unfamiliar with the building's safety features, including evacuation routes.

Lack of backup communications also impeded evacuation. Lack of knowledge of stairwell exits; unfamiliarity in general with the building layout and uncertainty as to whether or not certain stairwells would lead to street level exits caused delay and confusion. The study's initial findings suggest that some of the key factors affecting evacuation:
1. Knowledge of Emergency situation: we provide a way to deliver real-time critical information to the right people at the right place at the right time.
2. Knowledge of Emergency Procedures and Evacuation Routes
   One of the huge lessons of the recent shooting events is the importance of a campus-wide alert system that reaches all the people students, faculty, staff and visitors.

Such a system would be capable of making them immediately aware of any emergencies or danger present on the campus or the area. Since then universities has moved toward an early alert system that relies heavily on cell phone messages and text messaging.

Unfortunately, cellular communication is prone to crash in an emergency as it did in the all recent emergency events. The registration type text messaging system depends on cellular communication that does not usually continue in service, so messages may not be received.

Our main idea is based on the concept of direct communication between mobile phones and a sensor network (what we call way points). No internet and no cellular network is needed.

The system is based on Bluetooth communication protocol that is available on almost any new phone.

Our innovation reverses the current idea of "locating" the user by letting the user navigate utilizing to the sensor network of Bluetooth beacons (whose signal is sent by way points) directly to the user's mobile device. This will allow LBS (Local Base System) navigation, even indoors without GPS or Cellular network.

Our beacon can reach from 10 M to more then 1000 M distance depending on the application. (to get more accuracy less range and more beacons may needed so the 10 m is more then needed in building/room environment) getting more range to the "box" is as simple of attaching bigger antenna.

Local mapping available to day like: Malls maps, store maps, mapping of the department store, commercial buildings maps—hospitals, schools, campus, curt, municipal, shopping center, down town district, Indoor facility, building maps, parking area, parking garage, amusements parks, subway trains, transit maps, museum maps, area attractions maps, hotel and resort maps, and even the emergency maps available in any building area . . . .

All of the above have the following in common:
Local Places Indoor and Outdoor

Local maps available either on paper or on the web and in some cases at kiosks in the facility.

Do to the accuracy needed and the location (can be indoor) the GPS can't provide a solutions—GPS accuracy 200-300' when signal available, that is the reason that the GPS industry doesn't provide such a mapping.

The same is on the cellular network providers, as the accuracy is also 200-300' when signal available (problem indoor) and problem when you need it most—in emergency situation when most of the cellular network fails do to high demand. Again that is the reason that there is no local mapping available for cellular users. (Local mapping means=accuracy to a store, room, parking level . . . )

Most technology available today try to "locate" a moving "user" in an area, we reverse that idea and let the "user" navigate in the area—the local area on the local maps . . . .

Our solutions and method based on the same concept of GPS navigations but without the Satellite signals . . . or cellular network or towers . . . (The satellite in the GPS and the towers in the cellular are the base for the triangulation calculation to determine the "user" location for the existing navigation methods).

Simple to say—just think of it as a navigation when and where the signal to determine the exact location (with great accuracy then the GPS or the cellular technology) achieve by receiving a signal (a Bluetooth signal) from a known location of beacon devices installed in the local area.

By calculating the signals (triangulation method is one of them) that coming from known Identify beacon location we can achieve great accuracy—less then 10 m.

That will allow NAVIGATING on LOCAL MAPS on the "user" mobile phone via Bluetooth and without need of GPS and or Cellular network . . . !

The system includes:

Ability to load the local mapping (digitizer) at the facility via Bluetooth from a proximity WAP, and the ability to load the maps via web prior to arrival to the area.

Ability to have a special navigation software either add-on to the existing navigation on the user cell phone or in his existing navigation system (car, mobile), as a Bluetooth applications.

Ability to have the deployments of the Bluetooth beacons/ WAP in the local area the beacon will install in a known location—waypoints to provide the infrastructure need to the navigation in the proximity area.

Ability of the beacons/waypoints to log/ID and store the "user" Bluetooth ID (NOT THE CELLULAR NUMBER) for future marketing purposes or for emergency use (where the "user" are, or the last place where he was).

Beacons can be old Bluetooth cellular phones when there is no need for the cellular communication at all, just the cell phone Bluetooth and the battery . . . , some good way of use for the millions of old cellular phones.

Ability of a "local instant emergency messaging system", when local building/company/mall/university/school even small community can have the ability to communicate with other people via Bluetooth and chat and exchange important messaging for free without the need for cellular network or internet at all . . . how important it is in emergency!

Example of Use:

A user in a mall load the mall maps at the entrance of the mall from a Bluetooth WAP system (can be inside the mall directory point), directly to his cellular phone via Bluetooth.

A Bluetooth navigation application on the user mobile phone will receive a signal from a known location Bluetooth beacons and will determine the "user" location on the local mall map (the same way as a GPS) with accuracy of 5-10 m. (More beacon with LESS signal range=more accuracy)

We based our assumptions on the following facts:

Mobile phones are the most carry-in device by any "user" globally GPS and cellular network and the existing mapping can't handle the local mapping need especially indoor.

There is a great need for more accuracy outdoor and indoor GPS and cellular network can't provide the accuracy needed and the availability indoor/out door and in emergency situations.

The Bluetooth is the most used communication method today! And it is on more then 90% of the new cellular phone.

The Bluetooth has a way to recognize Bluetooth devices in the close proximity.

Most of the Technology Already Existing

We based our innovation on a direct communication between the Bluetooth beacons to the "user" cellular phone without need of Cellular network or GPS.

The local marketing is one of the biggest markets with over 150 B in US alone.

We Identify 14 kinds of applications
Nav4 Parking
Return2 Parking
Nav4Realty
Nav4Mall
Nav4Store
Nav4Sale
Nav4Museum
Nav4Conference
Nav4Show
Nav4Train
Nav4 Disney
Nav4Sign
Nav4Emergency
Nav4 Events Major part of implementing our system in a mall/store environment is involve the ability of the system to provide information about How consumers behaved throughout the real shopping experience: Nav4Mall—option for web like marketing and report.

Using our infrastructure of a Bluetooth "sensor network" in a mall, store or shopping center environment our innovation will represent a very unique ability to bring a web like shopping experience by its ability to keep up on the "user's" "surfing" or shopping habits in the shopping center, mall, or store. It will provide a better shopping experience (coupons, specials sales, according to the user shopping habits) and service to the shopper.

Even though it may look like a privacy issue, the add-on services, the application, and the idea that it may save the user's life (nav4emergency application), with the fact that the tracking does not reveal the person's name nor his telephone number, it is the same as the everyday use of surfing the internet when the user's IP is recorded by the web sites and provides the basis for the "ad sense" or the web marketing tools.

We believe that introducing our "sensor network" like system and the marketing tools above can help the users and the sellers to upgrade the real shopping experience of today with the advantage of the web like tools. It is an Ad-hoc sensor networks based on Bluetooth beacons.

We believe that large companies, shopping centers, malls, search engine, cellular manufacture store owners can be good candidates to offer the kind of service that fits very well with their business model; such a service can be offered for free to the "users" and back by advertising and the use of the data by the stores. Such service and application and the ability to include the emergency part of it will also ease the fear of "locating" or any privacy issue.

With the location based service as the main for the next generation application, especially for the cellular phone, we can assume that introducing our innovation can be a good fit, especially its introduction for the first time of internet marketing kind of tools for the traditional sale and advertising market.

Providing valuable solution that enhances the effectiveness of ad campaigns. Ability to optimize performance in real time has a positive effect on advertiser satisfaction. The fact that this service is well integrated into our system is a tremendous advantage.

Make our innovation as a performance-enhancing technology, providing with great data and customer service.

Can be an extremely effective way to optimize the performance of offline/online advertising campaigns in mall/store environment. For excellence in client services, the idea is a clear win-win for everyone."

Helped to understand where users are going on the mall/store in real life and their buying behavior patterns so we can continually adjust offers, placements and creative's to improve buy-through and maximize sales. Will evolve the mobile content into a bonfire revenue center.

An object of the present invention is to provide

An integrated emergency and notification system that will deliver real-time information to the emergency designated area ether directly to the people portable phone via long range Bluetooth and also provide an audio—FM broadcasting of the information and video to an LCD screen to alert and inform the people needed.

An object of the present invention is to provide

The authorities in emergency to pinpoint the emergency information and the notification to the exact emergency proximity, exactly to the right people in the effected area.

And to their cellular phones even if we don't know who they are, for instance if they are guest and not on any emergency list . . . and all that even if the cellular communications will fail or even not exist . . . .

Another object of the present invention is to provide the people trapped inside the emergency area to "pull" the emergency Guidance to their cellular phone and navigate safely to the exit route . . . and again doing all this without cellular communication . . . .

Yet Another object of the present invention is the ability of the system to allow the first responders to get the location and identification of the people trapped inside by locating their cellular phone from out side the building via our Bluetooth system with more accuracy than any cellular locating technology available today . . . .

Another object of the present invention is to offer a system that is economical, easy to implement and maintain and has multi use functionality In a non emergency situation such as campus/mall/building navigation . . . .

Another object is ability to use a "local instant emergency messaging system", when local building/company/mall/university/school can have the ability to communicate with other people via Bluetooth and chat and exchange important messaging for free without the need for cellular network at all . . . .

With that in mind our object of the invention is to provide an emergency system that can serve as add-on to the existing emergency systems.

Another object of the present invention is to provide a dynamic way to deploy the emergency system even to area/places where there is no infrastructure ready and using a portable carry-on "Notifier" devices allow broadcasting the emergency information to the proximity of the designated emergency area.

Another object of the present invention is to bring the building and commercial places emergency procedure from the paper era to the digital era, Knowing emergency information and then where the emergency exits are in buildings you frequent can save your life. Many disasters could have been prevented if people had known that there was an emergency situation the emergency procedure and where the exit routes were. According to our innovation the critical emergency information can reside on the cellular phone of the frequent "user"/student in a university/school, employee in a building/place an even a visitor that will be able to download the information via our Bluetooth to prepare for emergency, or as part of our nav4emergency innovation. The application and the building mapping and emergency procedure can be Reside at the SD/Mini SD/external memory of the cellular phones.

Another object of the present invention is to integrate our innovation as an add-on to existing emergency system, ability to integrate our "notifier" inside an "exit" emergency signs and emergency lights.

Our innovation brings the emergency plan and procedure to what it should be—a part of real life awareness, pre-emergency plan.

BRIEF DESCRIPTION OF THE DRAWINGS

A better understanding of the present invention may be obtained by reference to the accompanying drawings, which should be considered in conjunction with the detailed description, all in accordance with the present invention.

FIG. 5 is an illustration of the emergency system elements in accordance with the present invention.

DESCRIPTION OF THE PREFERRED EMBODIMENT

Figure 1:
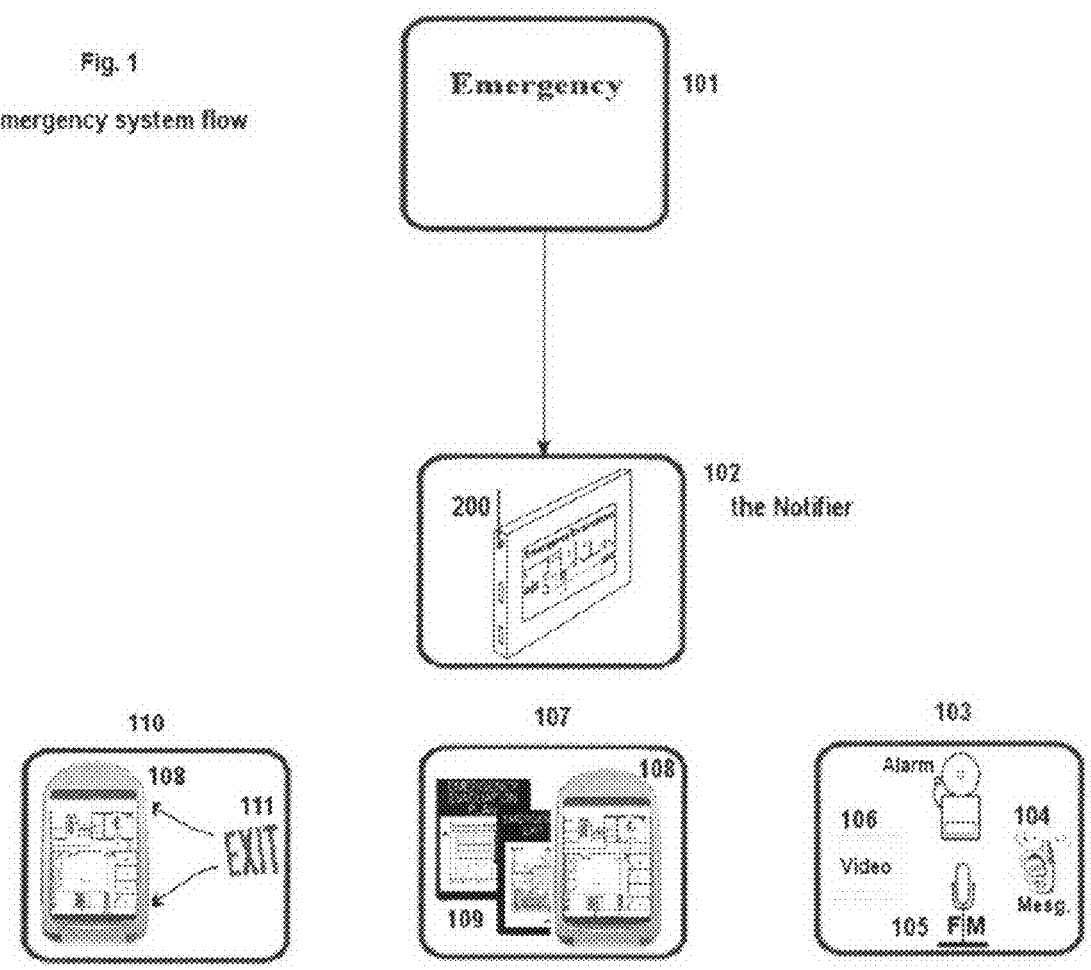
FIG. 1 is an illustration of our emergency system flow in an emergency situation in accordance with the present invention.

In all the figures of the drawings, sub-features and integral parts that correspond to one another bear the same reference symbol.

Referring now to the drawings in detail and first particularly to FIGS. 1-8 thereof.

These figures illustrate the method and system to provide critical emergency information in real-time as application on a cellular phone.

Referring to FIG. 1, its show our emergency system flow, starting when an emergency event is declare by the authority and the emergency control 101 trigger an alarm and notification in a area designated as emergency—the information deliver via wire or wireless network directly pin point to the emergency designated area to the emergency gateway "the notifier"—200, the "notifier" 200 will be install in a room level, a few in a building or in an area and will cover the proximity area using the built-in Bluetooth module.

Figure 6:
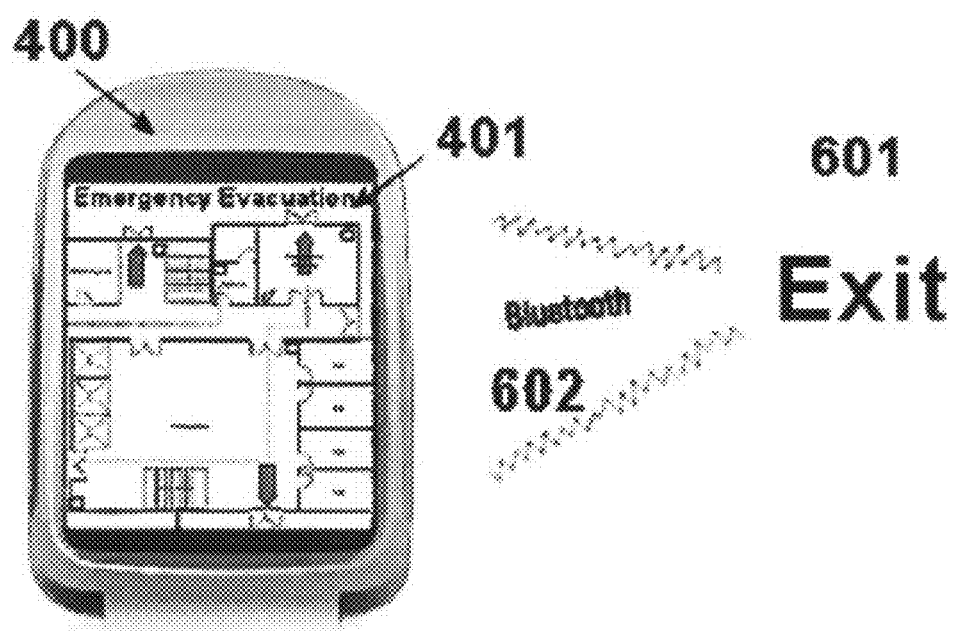
FIG. 6 is an illustration of the option of implementing the emergency system in an exit emergency light to provide emergency information in accordance with the present invention.

The "notifier" 200 operating have 3 parts:
1. Real-Time emergency alarming and notification 103, Push alarming and emergency information to cellular phone 104, in the emergency area via Bluetooth, broadcast instantly the information via FM 105, and video screens 106.
2. Emergency procedure and mapping Pull/download 107, via Bluetooth the emergency procedures including the buildings mapping 109, and will deliver via Bluetooth to the proximity cellular phone 400.
3. Emergency guidance and navigation to and in the exit route 110, Provide information to Navigate to the exit route, one of the option is to implement the "notifier" 200, inside the exit emergency lights 111, and again, the information will be send Directly to the portable phone 400, via the Bluetooth communication and no cellular network needed as can be seen in FIG. 6.

Figure 7:
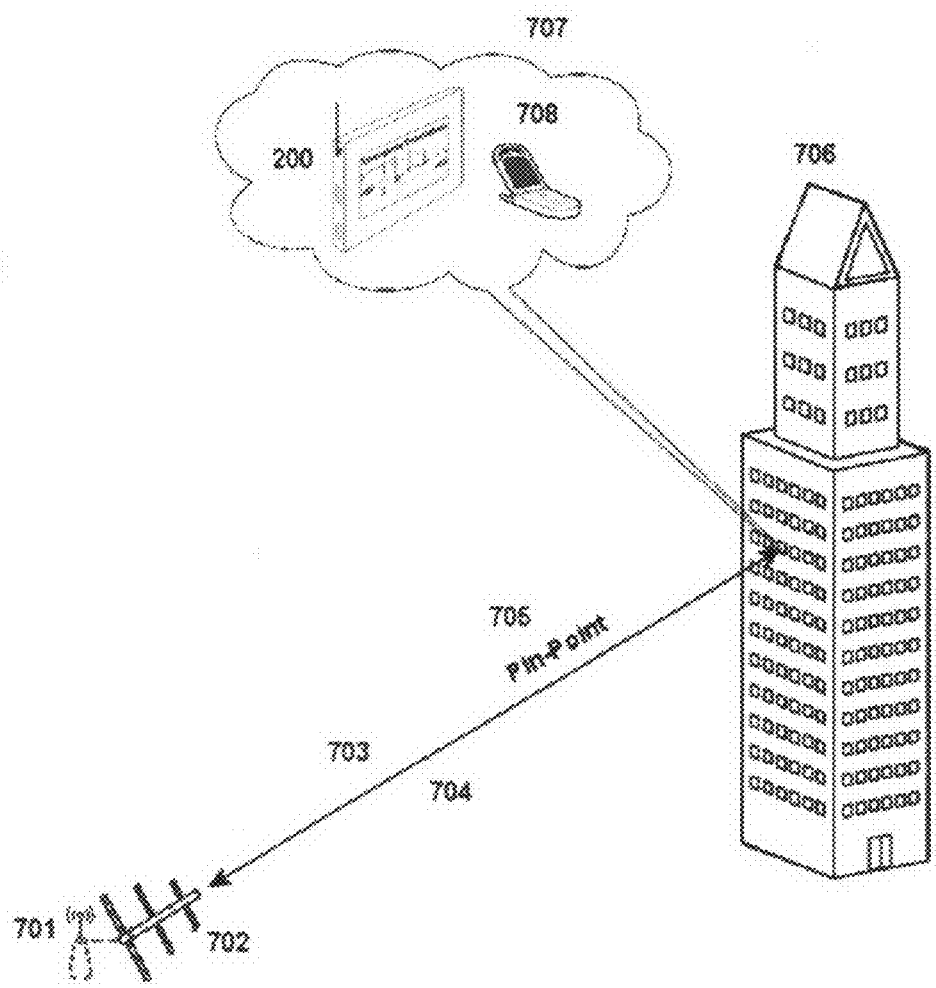
FIG. 7 is an illustration of the option of scanning, locating and report back of "user" and their Bluetooth devices/portable phones from remote in accordance with the present invention.

Also the system has a unique option to report to first responders by allowing identification of trapped people in the emergency and locate them, and even communicate with them from outside and again without need for cellular communication as can be seen in FIG. 7. More over it will allow the user to use a "local instant emergency messaging system", to communicate with other people via Bluetooth and chat and exchange important emergency messaging for free without the need for cellular network at all . . . .

Figure 2:
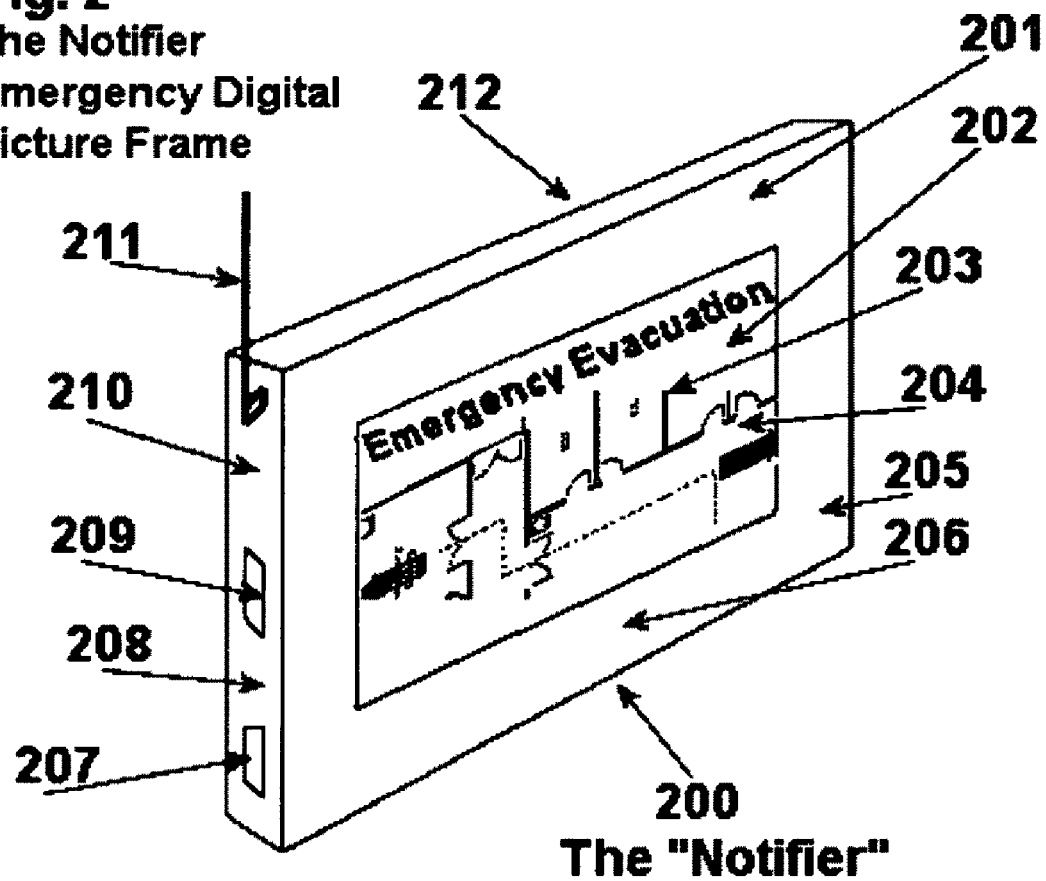
FIG. 2 is illustration of our emergency gateway—"the notifier" in accordance with the present invention.

Referring to FIG. 2, it illustration of our emergency gateway—"the notifier" in accordance with the present invention. The "notifier" 200, is our main emergency gateway can be install in a room level when and where the Bluetooth cover can depend On 211, external Bluetooth antenna with range from a room level 30-100 m to the entire building/area, best configuration is at a room level, the "notifier" include an alarm and emergency information 201, that will "push" to the proximity cellular phones (with Bluetooth enable) 400 as obex file format, the information will reach any Bluetooth enable devices in the proximity include portable phones 400 without need for any cellular network to be working at all, and without need of the Bluetooth devices/portable phones to be "pairing" with the "notifier".

another important part of the "notifier" 200, is an LCD screen 202, that will provide instant emergency information like emergency procedure and building/area mapping 203, an emergency "wap" service 204, will be include and will allow the "users" in the emergency proximity to "pull" the emergency procedure and map 203, directly to they portable phone via Bluetooth 400.

The alarming and emergency notification will be broadcast via FM module to an FM pre-plan channel 205, and will broadcast to a radio install in the area and to the "notifier" built-in speakers 206, to provide alarming and notification to all the people in the area even if they don't have a portable phone.

The "notifier" 200, can be install with or without the LCD module and can be installed in a wall or in the door, it can replace the emergency procedure or emergency mapping that used today to be post in a door or in a wall of any building.

Another part of the "notifier" 200, are an option to turn it on/off switch 207, the "notifier" need to be connected to the electricity, but in an emergency a rechargeable battery can keep it running for a few hours without electricity.

The "notifier" have also a slot 208, for external memory module like SD memory card to include a pre-plan emergency and the mapping 203, and pre plan emergency notification and procedure that can be trigger by remote from the central command 101, Aside from the Bluetooth the "notifier" also can be connected via USB port 209, to update the procedure And mapping 203 to be store in the 208, memory module, there is an option to connect it directly to the building/area network by wireless or wire IP network with option module.

One of the unique option of the "notifier" is to continue scan and detect 210, and store the proximity Bluetooth devices ID for a locating and detecting the occupants in an emergency situation, you can call it like the "black box" and a procedure for option to locate the information from remote or outside of the building is explain more in FIG. 7. the "notifier" can be program to work in "the background" to collect the proximity Bluetooth devices ID and only in emergency situation can be send the report back to the emergency control 101, to provide a unique way to inform who is inside, there is no privacy issue as the "notifier" will collect only the devices ID and not a user phone or name and only in emergency when it can save lives the information will be sent back to the emergency control center where they can be verify and become a very critical information that may be needed to the emergency response team. "users" that see that as a privacy issue have a complete control as they can disable their Bluetooth portable phone and no information will be deliver or store about them, but at the same time that information in emergency are critical and can save they lives.

Moreover it will allow the user to use a "local instant emergency messaging system have the ability to communicate with other people via Bluetooth and chat and exchange important messaging for free without the need for cellular network at all . . . .

The "notifier" can also serve in a non emergency situation as a beacon, Bluetooth beacon 212, for a non emergency navigation.

Figure 3:
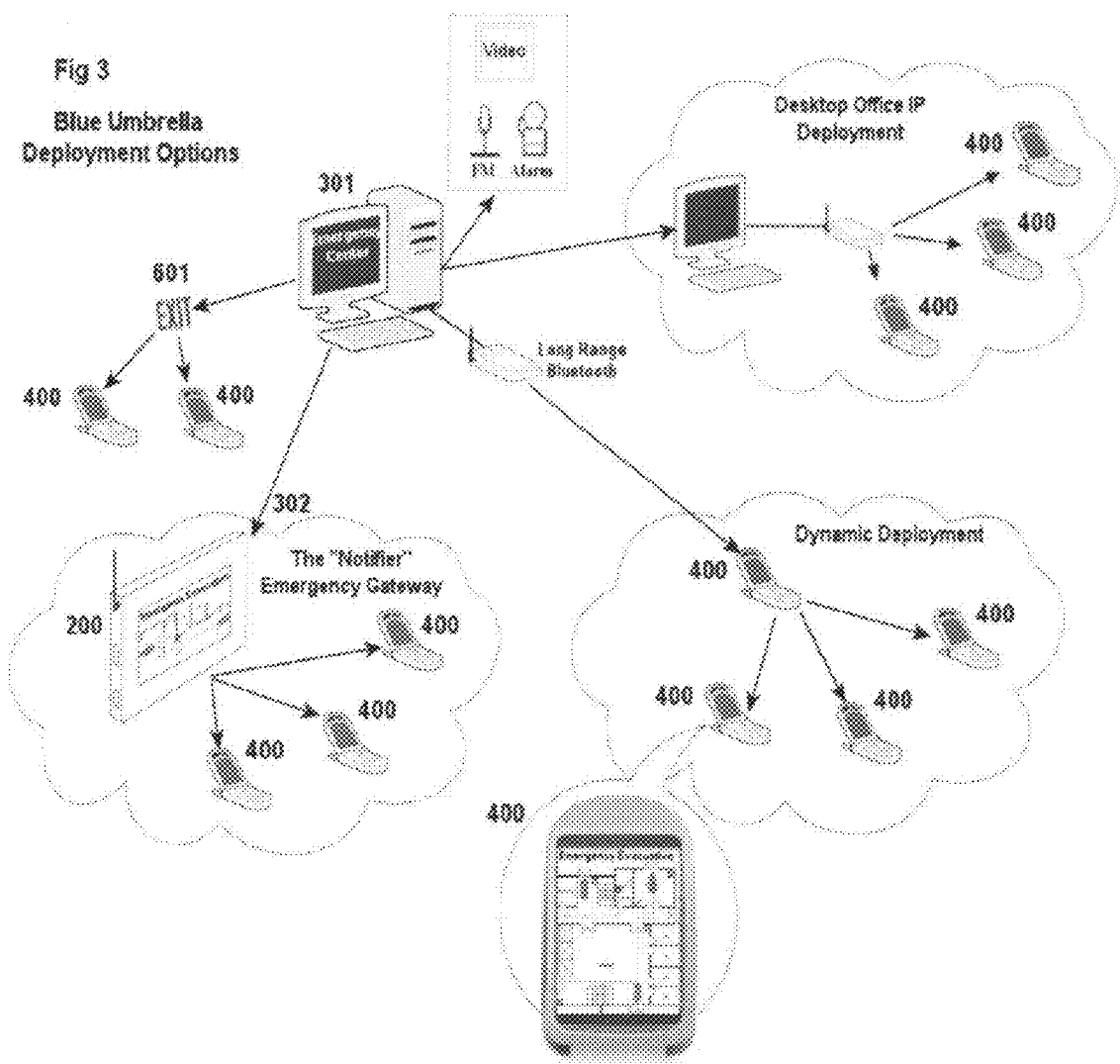
FIG. 3 is illustration of the emergency system deployment architecture in accordance with the present invention.

Turning to FIG. 3, it illustration of the emergency system deployment architecture in accordance with the present invention. The main of the system is the emergency gateway "the notifier" 200, that install in a building or an area and can trigger for emergency notification by remote—via wireless or wire network from the emergency center command 301, when emergency was declare 101, the system deployment 300, is based on Bluetooth communication 302, that have the ability to send emergency notification and alarming as well with emergency procedure and even real-time emergency information to the proximity portable phones 400, without need for cellular communication that prone to go down in emergency situations.

Figure 4:
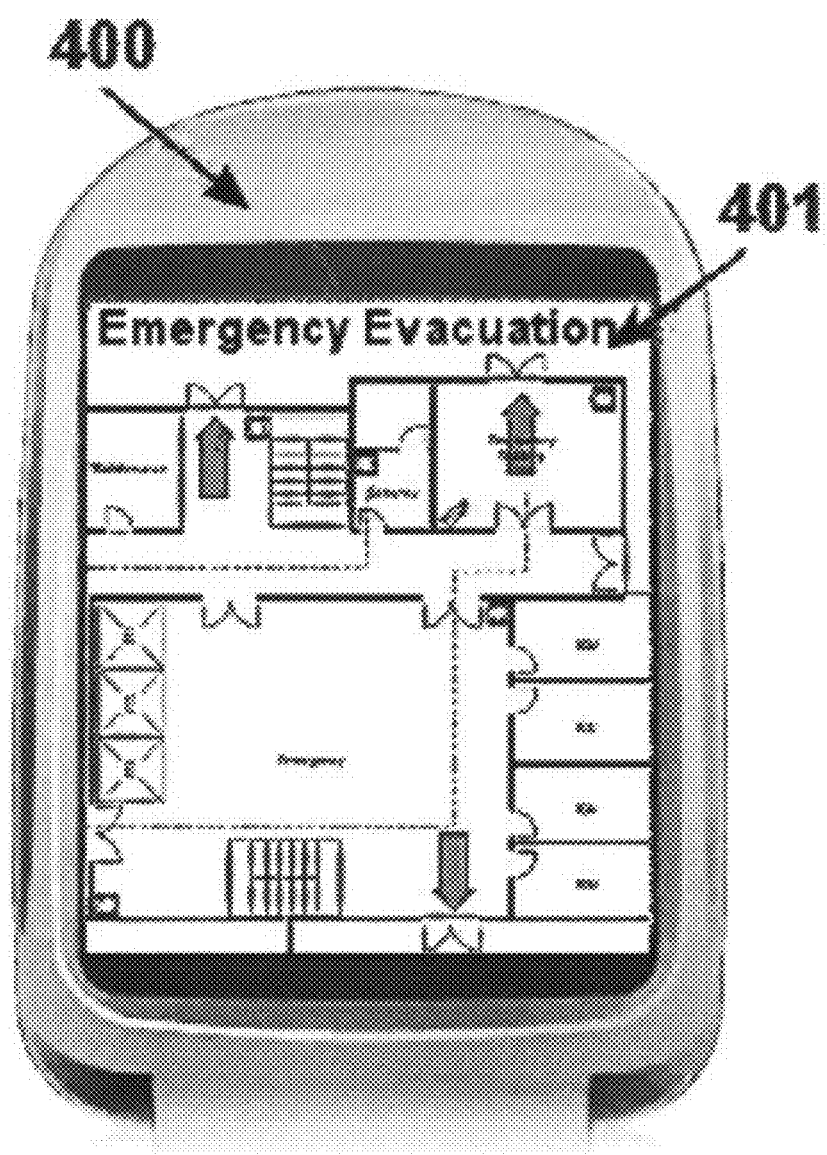
FIG. 4 is an illustration of a mobile phone in emergency navigation mode in accordance with the present invention.

Turning to FIG. 4, it show an illustration of a mobile phone 400, in emergency navigation mode to provide critical emergency information in real-time as application on a cellular phone, in accordance with the present invention. The application and the building mapping and emergency procedure 401, can be Reside at the SD/Mini SD/external memory of the cellular phones. as part of emergency application that can be and must be part of the telephone applications, people that frequent a place like tenants, employees, and students can have the emergency procedure and the mapping ready on their phones, it can trigger from remote areas an emergency (to alarm the user etc. . . . ), it allows saving a critical time in the emergency for getting the information . . . .

It will also allow sharing information using the dynamic deployment method explain in FIG. 8 below to other portable phones that in the proximity 801, and as is human nature, people will share information and notify the other people, In other word what we suggest is to have the emergency procedure 401, prepared and resided in the portable phone 400, as part of emergency procedure and making the portable phone a center for emergency notification and help the "user" to find his way to safety in emergency situations. We suggest making the emergency application an integrated part of the cellular phone application; we may offer a template to have the emergency procedure and the mapping setup according to the location and places.

It can be a mandatory for students in schools and employees in the workplace to store this critical information ready for the emergency.

The other option of "pulling" is to download the critical information when in an emergency via Bluetooth, but to save the critical time it suggests that you will have to prepare in advance for an emergency.

In a mall/store environment just think about the ability to store the mall/store map or directory on the telephone ext. memory (just like a GPS apping), the stores in a mall will be like point of interest, and the infrastructure of our Bluetooth beacons inside the mall/store will allow navigation inside the store/mall.

The information (mapping and directory) can be pre downloaded from the internet before access to the area or downloaded from a "wap" system at the directory information in the entrance of a mall.

Such a service can be easily backed by advertising from the stores and may be offered freely to the "users".

Turning to FIG. 5, is an illustration of the emergency system elements in accordance with the present invention. As mention the system main Advanced is the ability to work even when and where the cellular network is down as it append in the most recent emergency situations, no cellular network needed 501, and the information broadcast via bluetooth. The information can be deliver pin-point 503, to the proximity area 502, designated as the emergency area. When and where the emergency declare a notification and emergency procedure and emergency mapping 504, deliver to the proximity Portable phones 400, as emergency application 401, Another part of the system is to provide navigation to the exit route 505, the navigation is based on signal from the bluetooth beacons—the "notifier" 200, The system can provide a location and ID the proximity bluetooth devices 506, that option describe in more details in FIG. 7. and in 210 above.

The system have a multi-use in non emergency as navigation beacons 507, Ability to have the deployments of the Bluetooth beacons/WAP in the local area the beacon will install in a known location—waypoints to provide the infrastructure need to the navigation in the proximity area, such navigation can be offer on the portable phone 400, and such application like nav4emergency and navigation to and in the exit route and to safety.

As explain in FIG. 2, the system can be portable, networkable and have a rechargeable battery 508, One of the other benefit of the system is the ability to provide real-time emergency information 509, as describe in FIG. 1, 103-110. and include the ability to provide and broadcast the alarming and notification via FM radio and via Video 510, to LCD screen built in the "notifier" or separate screen that can provide critical emergency information to the need people in the emergency designated area.

Turning to FIG. 6, is an illustration of the option of implementing the emergency system in an exit emergency light to provide emergency information in accordance with the present invention.

The option providing the "notifier" like device that can be implement inside the emergency exit route 601, and via Bluetooth communication 602, will provide navigation and critical emergency notification and alert to 400, the "user" portable phone, there is also the possibility to scan detect occupants Bluetooth devices to report location and report back in emergency 210, and as describe in FIG. 7.

Turning to FIG. 7, is an illustration of the option of scanning, locating and report back of "user" and their Bluetooth devices/portable phones from remote in accordance with the present invention. the ability of the system to allow the first responders to get the location and identification of the people trapped inside by locating their cellular phone from out side the building via our Bluetooth system with more accuracy than any cellular locating technology available today . . . , utilizing the Bluetooth ability to scan for the proximity Bluetooth devices ID, by using the "notifier" like 701, with a long range pin-point yagi antenna 702, we test range of over 1000 m Ability of the beacons/waypoints to log/ID and store the "user" Bluetooth ID (NOT THE CELLULAR NUMBER) for emergency use (where the "user" are, or the last place where he was) the system will pin-point his scanning capability 705, and will receive the Bluetooth devices ID 704, from inside the building 706, from the in-building designated emergency area 707, from the proximity people inside portable phone with Bluetooth enable 708, or collect the information from the "notifier" 200, as describe in 210. such an option can be critical to events like 9/11 when and where people trap and there is no way to locate them using the cellular communication or other way, with our system the people trap can be located to almost 10 m accuracy and even make communication via Bluetooth-chat or receive and send information to help them to safety. use a "local instant emergency messaging system", can have the ability to communicate with other people via Bluetooth and chat and exchange emergency important messaging for free without the need for cellular network at all . . . .

Beacons can be old Bluetooth cellular phones when there is no need for the cellular communication at all, just the cell phone Bluetooth and the battery . . . , some way of use for the millions of old cellular phones.

Knowledge of Emergency situation, who trap inside, who are the people and pinpoint the emergency help to them, we provide a way to deliver real-time critical information to the right people at the right place at the right time even from along range from remote directly to the proximity people portable phone and all that without need of the cellular communication that prone to go down do to heavy use in emergency.

Figure 8:
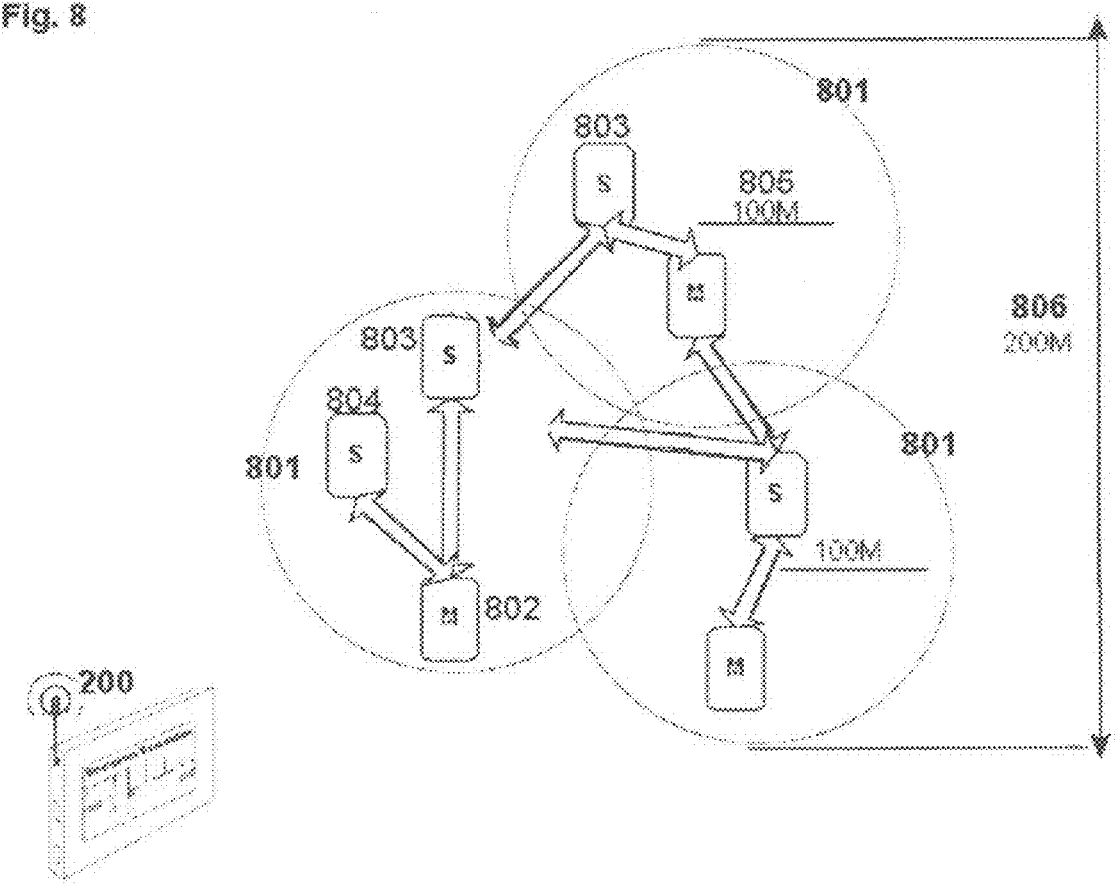
FIG. 8 is an illustration of the method of dynamic deployment of the emergency system in accordance with the present invention.

Turning to FIG. 8 is an illustration of the method of dynamic deployment of the emergency system in accordance with the present invention.

Allow allocation of notification and real-time alarming resources at the time they are needed—deployment of on-feet or movable carry-on "notifier" devices 200, by first responders or emergency personal in an area designated as emergency but lack the emergency infrastructure for notification and alarming.

This approach can prove especially effective when emergency occur in an area Out of the regular plan that need to be covered.

The system will use the Bluetooth built-in protocol stack module that is able to simultaneously interconnect for local devices=portable phones in a "piconet" 801, over the local area. The simultaneous connectivity limit of 8 devices at a time is overturn by the ability of several piconets to operate in a close proximity and Bluetooth devices=portable phones can rapidly move from one piconet to another, in fact Bluetooth devices need only remain a member 802, of a piconet 801, for the period of time required to complete a communication transaction. So devices=portable phones can join and leave a local piconet frequently like 803 device in the drawing effectively overcoming the 8 device limit. And that even without the option to use a long range Bluetooth antenna that can effectively reach a distance of over 1000 m. in the drawing it show 3 dynamic establishment of 3 piconets 801, for over a distance way over normal bluetooth for 806, 200 m.

The ability to form wireless as hoc Bluetooth network or networks based on a collection of Bluetooth "notifiers" 200, (mobile notifiers devices) that dynamically form a temporary network as long as these device are within a sufficient range (inside a room or a building), the flexibility in ad hoc network is what makes it suitable choice for emergency deployment scenarios where multiple "notifier" 200, devices would be deploy in a proximity area that designate as emergency in this drawing 806, to provide a new way of distributing emergency and alert information directly to the needed area.

More over, as a normal human behave there is no need to inform a full room, if only a few people from the occupied room will be informed or have the portable phone to receive the emergency information it will be more then needed as the information will be shared by the informed people.

The same method and idea is mimicked by the dynamic deployments, just think about it as a new way to deliver critical emergency alarming and notification without infrastructure In the area.

More over, the limitation of Bluetooth cover can be well overwhelmed by the ability of the Bluetooth method described above, for instance, in a very large conference place, the localized Bluetooth network (piconet) can join each other and form a big network that covers the entire place much larger then the limit cover of the Bluetooth. Portable phones at one end of the place communicate with a device at the other end and the traffic might be relayed via several bridge devices. Any Bluetooth devices, in our example portable phones that are Bluetooth enabled, can become the bridge. The phone owner does not need to know whether his/her device is a bridge, it is all done automatically as part of the Bluetooth protocol stack routine, in effect not changing any internal behavior of the Bluetooth.

And again, there is no need to reach all the people, only a few in a room to inform the emergency message.

More over our innovation will allow the user to use a "local instant emergency messaging system", the dynamic deployment allow to have the ability to communicate with other people in the proximity via Bluetooth and chat and exchange important messaging for free without the need for cellular network at all . . . . Just think what it can be done in emergency or even in army deployment as other communication method.

From the old days in history, humans used messengers to deliver news and information Our method uses the old concept with a device that will make it easy to distribute and broadcast the information around, using the messengers as the mobile emergency notification or as we call it—Dynamic deployment.

From the outset, our system was been designed with the capability to utilize existing technology so it can be deployed as a stand-alone system, or in tandem with existing systems. We focused on technology already in place that simply needs to be expanded. With the implementation of our system, a FIRST RESPONSE TEAM will be empowered to navigate and find its way in a case of emergency or a disaster. This capability can be a critical life saving power in modern congested urban living conditions, not available before now.

We believe that implementation of our system will assist counter terrorism activities and more importantly will help the first response teams to save the lives of people trapped inside buildings. It can save life.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method for providing a building or area occupants a critical emergency information and navigation to and the emergency exit route according to the user location indoor and outdoor in or on at least one display device selected from the group consisting of a display devices, a mobile phone, hand held computer system, and a Bluetooth enabled device, the method comprises the steps of:
    1. installed RF/Bluetooth tags in an area/building in a known location providing the infrastructure for indoor or emergency navigation,
    2. real-time emergency alarming and notification: push alarming and emergency information to cellular phone in the emergency area via bluetooth, and broadcast in simulate the information via frequency modulation radio and video screens,
    3. providing emergency procedure and mapping: pull/download the emergency procedures including the buildings mapping, say emergency information can be reside on user mobile as standard procedure for current occupants providing digital emergency guidance or download in emergency,
    4. emergency guidance and navigation to and in the exit route: provide information to navigate to the exit route.

2. The RF tags according to claim 1, wherein said RF tag can be installed on any place that designated as a waypoint in a known place along a building or an area for emergency and non emergency beacon.

3. The frequency modulation data according to claim 1 wherein said frequency modulation information will broadcast as Radio Data System (RDS) information containing information about any place that designated as a waypoint.

4. The method according to claim 1, which further comprises displaying the information over a facility map, area map, GPS mapping or floor plan on the user mobile phone device.

5. The method according to claim 1, wherein the information pertains to provide waypoints in a current area indoor or outdoor without help of GPS or Cellular identification (id), providing pinpoint accuracy of the way point.

6. The method according to claim 1, which further comprises determining a current position of a user by a triangulation calculation or proximity based on known positions of a plurality of wireless RF or Bluetooth tags implements in a known positions in the facility area or building designated as Infrastructure for indoor navigation or emergency navigation.

7. The method according to claim 1, which further comprises allowing displaying additional information or advertising of a waypoints.

8. The method according to claim 1, which further comprises providing the display device/cellular phone with application software for displaying pre-loaded area maps or facility floor plans.

9. The method according to claim 1, which further comprises determine user location directly from the RF/Bluetooth tag according to the user proximity position to the tags and no bandwidth, cellular communication or internet needed.

10. The method according to claim 1, which further comprises receiving directly the information from the RF or Bluetooth tags without sending a request or a query for search in a central database or internet.

11. The method according to claim 1, which further comprises providing infrastructure for indoor or outdoor navigation in the type of the facility or area selected from the group consisting but not limit of:
  navigating a pedestrian in an environment like a mall, department store, specialty store, conference, trade show, amusement park, university, hospital, school, municipal building, museum, subway, train station, airport, hotel and resort, cruise ship, down town center, any type of parking facility or any place when and where GPS cannot be provided or is not accurate or precise enough.

12. The method according to claim 11, which further comprises using the infrastructure to navigate in a special operation mode: nav4parking, provides navigating to available empty parking spaces and navigation back to the parking spaces as return2parking.

13. The method according to claim 11, which further comprises
  navigate in a special operation mode: nav4store, provides navigation inside a store/department store to a specific department/aisle or specific product, with option for advertising method and special promotion.

14. The method according to claim 11, which further comprises navigate in a special operation mode nav4sale, provides navigating to a special sale item in a department store and navigate directly to item location.

15. The method according to claim 11, which further comprises navigate in a special operating mode: nav4museums, nav4show, nav4conference provides indoor navigation in the museum's the show or conference exhibition directly to the user navigation and or cellular phone device, utilizing the Bluetooth the user can receive additional information and audio, video eliminate the need to have a rental headset.

16. The method according to claim 11, which further comprises navigate in special operating mode: nav4realty, provides accuracy to pinpoint for the available real estate property for sale/lease/rent and navigation to them according to the user location as add-on to GPS navigation.

17. The method according to claim 11, which further comprises navigate in a special operating mode: amusement park, nav4disney provides exhibit and attractions waypoints outdoor and indoor the amusements facilities and interactive information from amusements park exhibition to the user navigation and or cellular phone device, say navigation on the amusement map, the exhibition as a waypoint information like schedule of show, availability (lines) time to the show, type of the waypoint like restrooms, food area and provide a remote fast pass generation to eliminate lines.

18. The method according to claim 11, which further comprises navigate in a special operating mode:
  nav4emergency which comprises navigation and alarming and notification to the emergency exit route using the emergency exit floor plan and escape with the knowledge of his exact location in that route, aspects of the scenarios to be included:
  identifies and tracks the user and
  provides the user with navigation information and directions for safely exiting of the building.

19. The method according to claim 11, which further comprises navigate in a special operating mode: nav4train, provides the user with ability to know his exact location in the train, bus or subway station on a route directly to his phone, indoor or outdoor which comprises the train/subway/underground map as a navigation and will show to the user his exact location in the train/subway route, and additional information like schedule, restroom, food, emergency.

20. The method according to claim 11, which further comprises generating waypoint of the road sign to be display on the user navigation and or cellular phone as a way for secure driving, the information can interface to the car computer to for example automatically slow down when enter school zone—nav4sign.

21. A business model method according to claim 1, which further comprises the steps of:
  1. the RF or Bluetooth tag installed in the area or building in a known location designate as a waypoint and providing the triggering mechanism and proximity locating engine as infrastructure for indoor navigation or add-on to GPS in outdoor with accuracy below 1 meter,
  2. each business designate as a way point will pay fee for displaying his waypoint information pinpoint to his exact location and additional information on the user mobile phone/navigation,
  3. payments will be to infrastructure provider,
  4. each waypoints/business will have an option to provide more information and or advertising directly to the user navigation and or cellular phone trigger when and where the user reach his location say the information can be deliver by other communication method to the user mobile.

* * * * *

UNITED STATES PATENT AND TRADEMARK OFFICE
CERTIFICATE OF CORRECTION

| | | |
|---|---|---|
| PATENT NO. | : 7,924,149 B2 | Page 1 of 1 |
| APPLICATION NO. | : 12/069899 | |
| DATED | : April 12, 2011 | |
| INVENTOR(S) | : Ehud Mendelson et al. | |

It is certified that error appears in the above-identified patent and that said Letters Patent is hereby corrected as shown below:

Title Page, Item (62) Related U.S. Application Data, "Division of application No. 11/427,706" should correctly read -- Division of application No. 11/472,706 --.

Signed and Sealed this
Sixteenth Day of August, 2011

David J. Kappos
*Director of the United States Patent and Trademark Office*